US009377064B2

(12) United States Patent
Pritz (10) Patent No.: US 9,377,064 B2
(45) Date of Patent: Jun. 28, 2016

(54) MULTIPLE-PISTON DISC BRAKE (71) Applicant: KNORR-BREMSE Systeme fuer Nutzfahrzeuge GmbH, Munich (DE)

(72) Inventor: Wolfgang Pritz, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 14/099,332

(22) Filed: Dec. 6, 2013

(65) Prior Publication Data

US 2014/0090934 A1 Apr. 3, 2014

Related U.S. Application Data (63) Continuation of application No. PCT/EP2012/060360, filed on Jun. 1, 2012.

(30) Foreign Application Priority Data

Jun. 9, 2011 (DE) .......................... 10 2011 103 823

(51) Int. Cl.
 *F16D 55/2255* (2006.01)
 *F16D 55/226* (2006.01)
 *F16D 65/18* (2006.01)
 *F16D 65/56* (2006.01)
 *F16D 121/14* (2012.01)
 *F16D 125/28* (2012.01)

(52) U.S. Cl.
 CPC .......... *F16D 55/226* (2013.01); *F16D 55/2255* (2013.01); *F16D 65/183* (2013.01); *F16D 65/567* (2013.01); *F16D 2121/14* (2013.01); *F16D 2125/28* (2013.01); *F16D 2250/0084* (2013.01)

(58) Field of Classification Search
 CPC .............. F16D 55/2255; F16D 65/568; F16D 2125/28; F16D 65/567
 See application file for complete search history.

(56) References Cited

U.S. PATENT DOCUMENTS

| 5,060,765 A * | 10/1991 | Meyer .......................... 188/71.9 |
| 5,520,267 A * | 5/1996 | Giering et al. ............... 188/72.9 |
| 5,529,150 A * | 6/1996 | Buckley et al. .............. 188/72.9 |
| 5,788,022 A * | 8/1998 | Antony ........................ 188/71.8 |

(Continued)

FOREIGN PATENT DOCUMENTS

| CN | 1517572 A | 8/2004 |
| CN | 101163903 A | 4/2008 |

(Continued)

OTHER PUBLICATIONS

Machine translation of DE 10 2009 013 005.*

(Continued)

*Primary Examiner* — Bradley King
(74) *Attorney, Agent, or Firm* — Crowell & Moring LLP (57) ABSTRACT A multiple-piston disc brake includes a brake caliper overlapping brake disc, at least two pressure pistons that are movably arranged in the brake caliper to apply a clamping force to at least one brake pad in the direction of the brake disc, a pressure plate that is coupled to the at least two pressure pistons, and a clamping unit that has a pressure tube and an adjustment device, a bridge and a lever. Each of the at least two pressure pistons is mounted in an axially movable manner in a pressure piston guide securely connected to the brake caliper.

13 Claims, 5 Drawing Sheets

(56) References Cited

U.S. PATENT DOCUMENTS

| | | | | |
|---|---|---|---|---|
| 5,819,884 | A | * | 10/1998 | Giering .................. 188/71.9 |
| 6,354,407 | B1 | * | 3/2002 | Heinlein et al. ............. 188/71.1 |
| 6,435,319 | B1 | * | 8/2002 | Thomas et al. .............. 188/72.1 |
| 6,811,004 | B1 | | 11/2004 | McCann et al. |
| 2004/0163899 | A1 | * | 8/2004 | Heinlein ................. 188/72.1 |
| 2014/0166412 | A1 | * | 6/2014 | Howard et al. ............. 188/71.8 |

FOREIGN PATENT DOCUMENTS

| | | |
|---|---|---|
| DE | 42 17 983 A1 | 1/1993 |
| DE | 10 2009 013 005 B3 | 8/2010 |
| DE | 10 2009 023 416 A1 | 12/2010 |
| EP | 1 160 476 A2 | 12/2001 |
| EP | 2 175 156 A1 | 4/2010 |
| EP | 2 228 559 A1 | 9/2010 |
| EP | 2 228 559 B1 | 8/2011 |
| WO | WO 2006/111136 A1 | 10/2006 |

OTHER PUBLICATIONS

English translation of the Written Opinion (PCT/ISA/237) dated Dec. 10, 2013 {Six (6) pages}.
International Search Report (PCT/ISA/210) with English translation dated Aug. 21, 2012 (Five (5) pages).
German Office Action dated Mar. 16, 2012 (Six (6) pages).
Chinese Office Action dated May 18, 2015 (seven pages).

* cited by examiner

MULTIPLE-PISTON DISC BRAKE

CROSS REFERENCE TO RELATED APPLICATIONS

This application is a continuation of PCT International Application No. PCT/EP2012/060360, filed Jun. 1, 2012, which claims priority under 35 U.S.C. §119 from German Patent Application No. 10 2011 103 823.3, filed Jun. 9, 2011, the entire disclosures of which are herein expressly incorporated by reference.

BACKGROUND AND SUMMARY OF THE INVENTION

The invention relates to a multiple-piston disc brake.

Multiple-piston disc brakes with hydraulic or pneumatic actuation by way of brake cylinders acting on an application unit are known in a very wide variety of embodiments. For example, DE 10 2009 013 005 B3 describes a double-piston disc brake of this kind.

It is the object of the present invention to provide an improved multiple-piston disc brake, in particular one improved as regards the number of parts and its robustness.

This and other objects are achieved by a multiple-piston disc brake having a brake caliper overlapping a brake disc; at least two pressure pistons, which are arranged movably in the brake caliper to apply an application force to at least one brake pad in the direction of the brake disc; a pressure plate, which is coupled to the at least two pressure pistons; an application unit, which has a pressure tube having an adjustment device, a bridge and a lever. The multiple-piston disc brake is characterized in that each of the at least two pressure pistons is mounted in an axially movable manner in a pressure piston guide securely connected to the brake caliper.

The multiple-piston disc brake combines the simplicity, robustness and ease of maintenance of a single-piston brake with the advantages of multiple-piston actuation. The number of individual parts is significantly reduced in comparison with the prior art.

In one embodiment, the pressure piston guide is arranged in a bottom plate. This eliminates the need for additional holders and guides.

The pressure piston guide of the multiple-piston disc brake can be formed integrally with the bottom plate. This gives a robust, simple embodiment, wherein the tangential forces received in the pressure pistons can be introduced directly over a short distance into the bottom plate via the pressure piston guide during the braking operation.

The pressure piston guide can furthermore be provided with a sealing device which interacts with an associated pressure piston. Simple and effective sealing of the interior of the brake is thereby achieved.

It is particularly advantageous if the sealing device has at least one stripper element and at least one seal element, wherein these are arranged in series.

Provision is made here for the at least one stripper element to be arranged on that side of the bottom plate which faces the brake pad and for at least one seal element to be arranged on that side of the bottom plate which faces away from the brake pad. This results in a simple arrangement, which also additionally facilitates maintenance and exchange work on the seal element since the at least one seal element can be reached from that side of the bottom plate which faces away from the brake pad.

In another embodiment, the pressure plate is coupled to the at least two pressure pistons by pressure joints which can be pivoted about an axis arranged perpendicularly to an application direction. The pressure joints can have pin connections, which are easy to assemble and disassemble, allowing simple and quick installation and removal.

In yet another embodiment, the pressure plate and/or the lever can be designed as a machined forged part or as a cast part. It is thereby possible to influence force flow profiles within the components in a particularly advantageous manner, and to achieve a long service life.

It is also possible for the wear adjustment device to be arranged in the brake caliper in such a way that it can be reached and exchanged from the outside, thereby making it possible to reduce maintenance times.

A brake system for a vehicle can be fitted with the multiple-piston disc brake described above.

Moreover, no synchronization of the pressure pistons with additional components is required since the pressure joints, the pressure plate and the pressure pistons guided in the pressure piston guides of the bottom plate together form a relatively rigid connection of the pressure pistons.

The small number of components also results in a weight reduction.

The seal element arranged within the interior of the brake is exposed to relatively little contamination. Moreover, it is easy to reach and exchange.

It is possible to prevent a process in which the pad is twisted out, so to speak.

The application unit can be used with various multi-armed pressure plates for a variable number of pressure pistons.

Oblique wear of brake pads can be reduced by the pressure piston guides arranged securely in the bottom plate.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
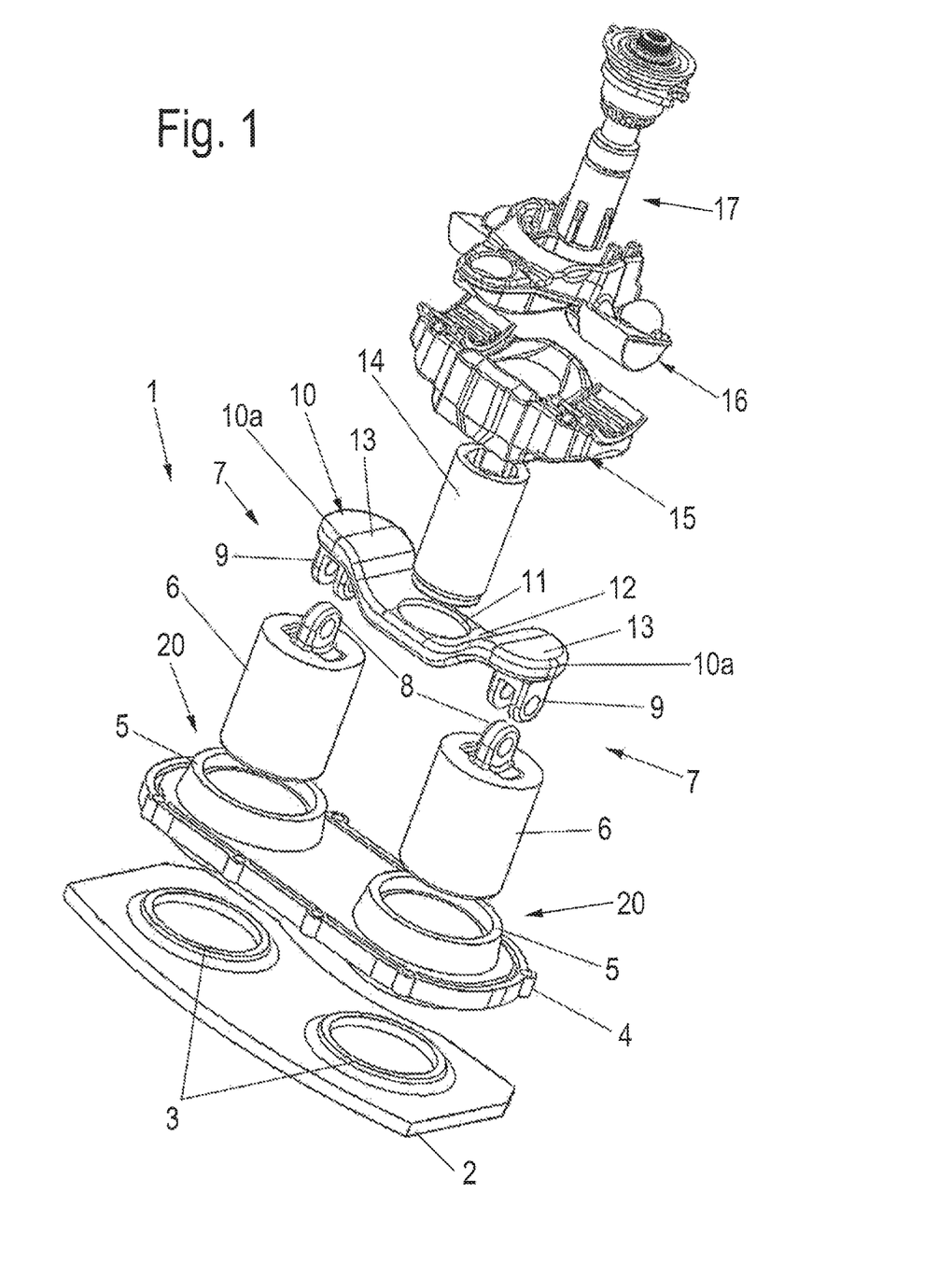
FIG. 1 shows a schematic perspective exploded view of an illustrative embodiment of a multiple-piston disc brake according to the invention wherein the caliper and brake disc are omitted.

FIG. 1 is a schematic perspective exploded view of an illustrative embodiment of a multiple-piston disc brake 1 wherein for clarity the caliper and brake disc are not shown. In this illustrative embodiment, the disc brake 1 is a multiple-piston disc brake 1 having two pistons, which are embodied as pressure pistons 6. Here, the disc brake 1 is shown from the application side thereof and has a brake caliper (not shown and which straddles a brake disc which also is not shown). Brake pads 2 are arranged on both sides of the brake disc, only the application-side brake pad 2 being depicted here. The other brake pad is fixed in the brake caliper. The brake pad 2 is shown in simplified form, and no brake pad carrier is shown. The brake caliper can be a sliding caliper, for example. No return and tension springs are shown, but these are readily understood in the art.

The brake pad 2 or brake pad carrier has two pressure sections 3, which are each provided for interaction with an underside of a pressure piston 6. The pressure pistons 6 are guided axially in a bottom plate 4 in an application direction. The bottom plate 4 is securely connected to the brake caliper (not shown) and has a pressure piston guide 5 for guiding each pressure piston 6.

Each pressure piston guide 5 extends perpendicularly to the bottom plate 4 and projects from it by a certain amount on both sides. A sealing device 20 for sealing the pressure pistons 6 relative to the bottom plate 4 and the interior of the brake is provided in each pressure piston guide 5 and will be explained in greater detail below. The bottom plate 4 and the pressure piston guides 5 thereof are of correspondingly robust construction for the absorption of tangential forces during the braking process.

On the ends opposite the undersides of the pressure pistons 6, said undersides interacting with the brake pad 2, the pressure pistons 6 are each connected in an articulated manner to a pressure plate 10 by a pressure joint 7. A pressure joint 7 consists of a tongue-shaped pressure piston joint section 8 and a pressure plate joint section 9, the latter being fork-shaped in this case. The joint sections 8 and 9 are connected pivotably by a pin (not shown). Pivoting about the axis of the respective pin or pressure joint 7 is possible in order to compensate for irregularities in the braking process. These pressure joints 7 too are of correspondingly robust construction. This pivoting axis extends perpendicularly to an application direction or the center line of the associated pressure piston 6 and tangentially to the direction of rotation of the brake disc. A relatively rigid connection of the pressure pistons 6 is created by way of these pressure joints 7, the pressure plate 10 and the pressure pistons 6 guided in the pressure piston guides 5 of the bottom plate 4, thereby eliminating the need for synchronization of the pressure pistons 6 by use of additional components.

The pressure plate 10 has two pressure arms 10a, on the underside of which (i.e. facing the pressure pistons 6) a pressure plate joint section 9 is in each case mounted. The pressure arms 10a are arranged perpendicularly to the application direction and parallel to the tangential direction with respect to the brake disc (not shown). The pressure arms 10a are connected to one another by a central section 12 and are formed in such a way that they are each offset therefrom outward and upward counter to the application direction.

The central section 12 of the pressure plate 10 has a force introduction section 11, and each pressure arm 10a forms at its end a pressure section 13.

The force introduction section 11 is provided for interaction with an application unit. This application unit includes a threaded tube 14, a bridge 15 and a lever 16 (also referred to as a brake lever). The application unit and the pressure piston 6 with the pressure plate 10 are arranged in the brake caliper or brake housing. The threaded tube 14 is also part of an adjustment device 17 for wear compensation of the disc brake 1.

The threaded tube 14, the center line of which extends in the application direction parallel to the axes of the pressure pistons 6, is accommodated by its underside, which faces the brake disc, in a corresponding receptacle in the central section 12 of the pressure plate 10 to allow force transmission. The threaded tube 14 is provided to accommodate the adjustment device 17 and to interact with the latter. The adjustment device 17 can be inserted into the threaded tube 14 from the end of the threaded tube 14 opposite the underside of the threaded tube 14. The operation of the adjustment device 17 in conjunction with the threaded tube 14 is explained in detail in the patent DR 10 2009 013 005 B3, the subject matter of which is incorporated as non-essential matter herein.

The bridge 15 and the lever 16 are likewise described comprehensively in the patent DE 10 2009 013 005 B3. The lever 16 has an actuating section and reaches around the adjustment device 17 in the manner of a fork with hearing sections, in the upper sides of which are mounted balls by which the lever 16 is supported on the brake caliper. The undersides of these bearing sections are each in contact with force transmission sections of the bridge 15.

In this illustrative embodiment, the bridge 15 is in operative connection with an external thread on the threaded tube 14 for transmission of braking and reaction forces. For a more detailed description, attention is drawn to DE 10 2009 013 005 B3.

Figure 2:
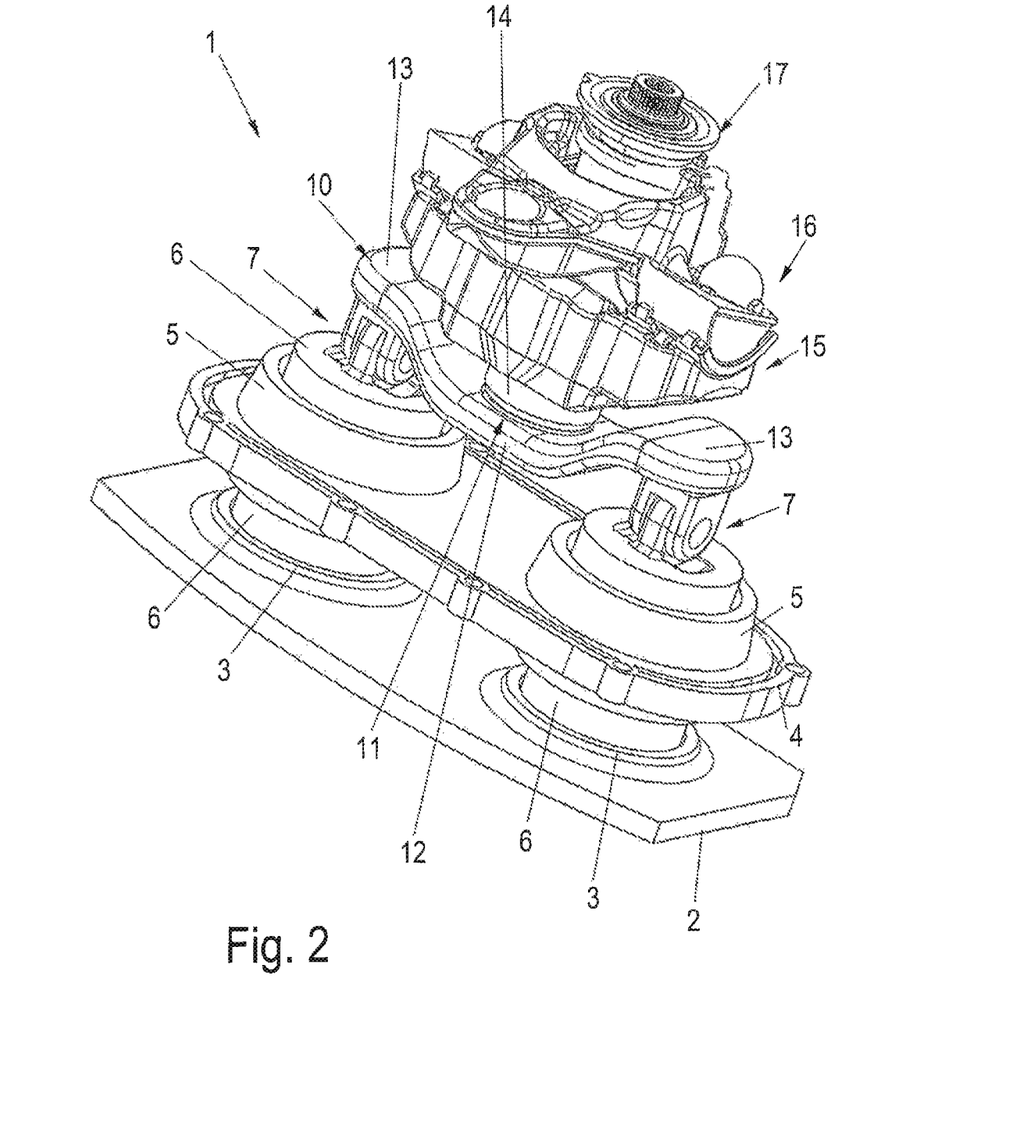
FIG. 2 shows a schematic perspective view of the illustrative embodiment according to FIG. 1 is an assembled state.
Figure 3:
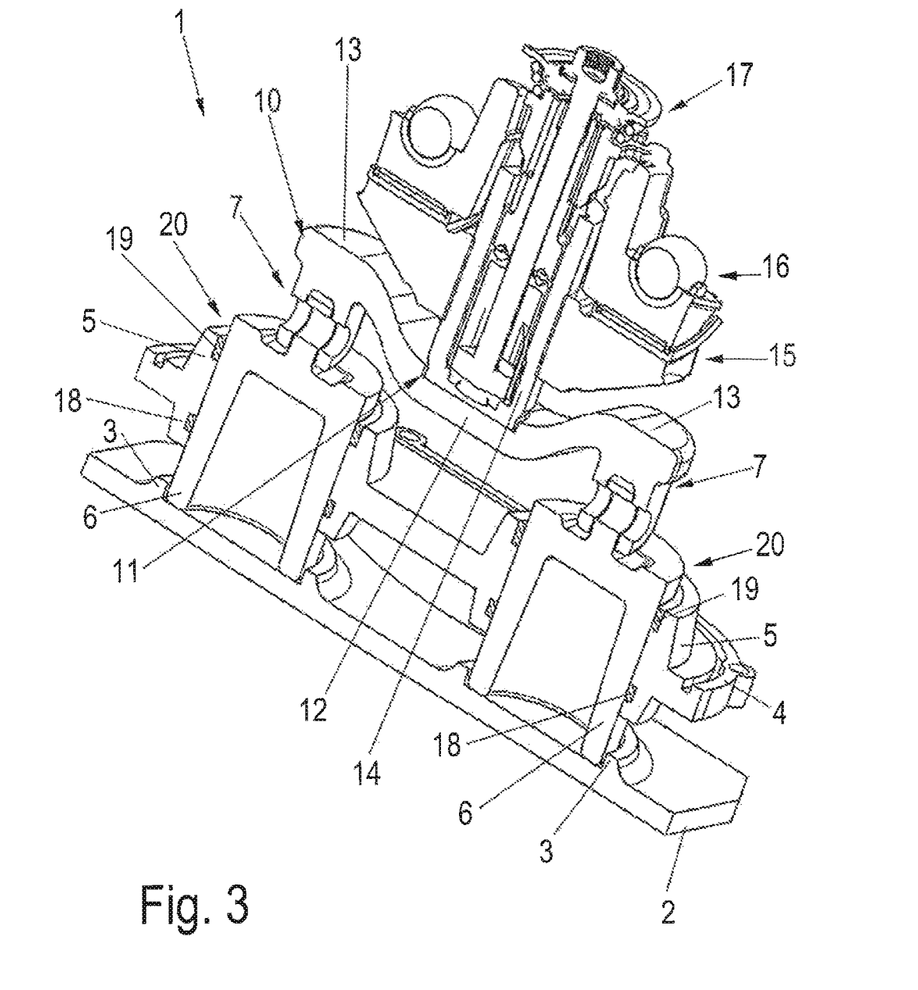
FIG. 3 shows a schematic sectional illustration of the view according to FIG. 2.

FIG. 2 shows a schematic perspective view of the illustrative embodiment according to FIG. 1 in an assembled state, and FIG. 3 shows a schematic sectional illustration of the view according to FIG. 2. Pins of the pressure joints 7 are not shown but would be understood.

In FIGS. 2 and 3, it can be seen that the adjustment device 17 is arranged in the brake caliper in such a way that it can be reached and exchanged easily from the outside. A robust, compact and service-friendly construction of the disc brake 1 is obtained.

The pressure pistons 6 are guided within the pressure piston guides 5 in such a way as to be axially movable in the bottom plate 4. In this illustrative embodiment, a length of guidance of the pressure pistons 6 in the pressure piston guides 5 is about half a total length of a pressure piston 6.

Here, the pressure piston guides 5 have a circular-cylindrical configuration. The center lines thereof are each coaxial with the center line of the respectively inserted pressure piston 6. Here, the pressure piston guides 5 are formed integrally with the bottom plate 4, and a section which faces the brake pad 2 has in each ease an axial length which corresponds approximately to the thickness of the bottom plate 4. A section of the pressure piston guides 5 which faces the application unit is in each case provided with an axial length which is approximately twice the thickness of the bottom plate 4.

The sealing device 20 of a pressure piston guide 5 has at least one stripper element 18 and at least one seal element 19. A groove is in each case formed in those sections of the pressure piston guides 5 which face the brake pad 2, in which groove a stripper element 18 is inserted. The stripper element 18 interacts with the associated outer surface of the pressure piston 6 inserted into the respective pressure piston guide 5 and, together with the seal element 19, serves to seal the pressure pistons 6 relative to the bottom plate 4 and thus relative to the interior of the brake.

The seal element 19 is furthermore arranged in that section of the pressure piston guides 5 which faces the application unit, at an axial distance from the respective stripper element 18. In this embodiment, it is inserted in a corresponding radial recess from the side of the application unit. It can be a corresponding piston seal, for example. The seal element 19 can be reached easily for maintenance and exchange purposes from the side of the application unit.

Other combinations of sealing and stripper elements, including larger numbers thereof, are of course possible.

In the case of a brake actuation, the force is transmitted from the lever 16 to the bridge 15, which introduces the force into the threaded tube 14. From there, the force is transmitted to the force introduction section 11 of the central section 12 of the pressure plate 10. The pressure plate 10 distributes the force to the pressure sections 13 of its pressure arms 10*a*, which transmit the force into the pressure pistons 6, in each case via the pressure joints 7, and thus to the brake pad 2 and, by virtue of the sliding brake caliper, simultaneously to the other brake pad. Thus, synchronization of the pressure pistons 6 is not required.

Figure 4:
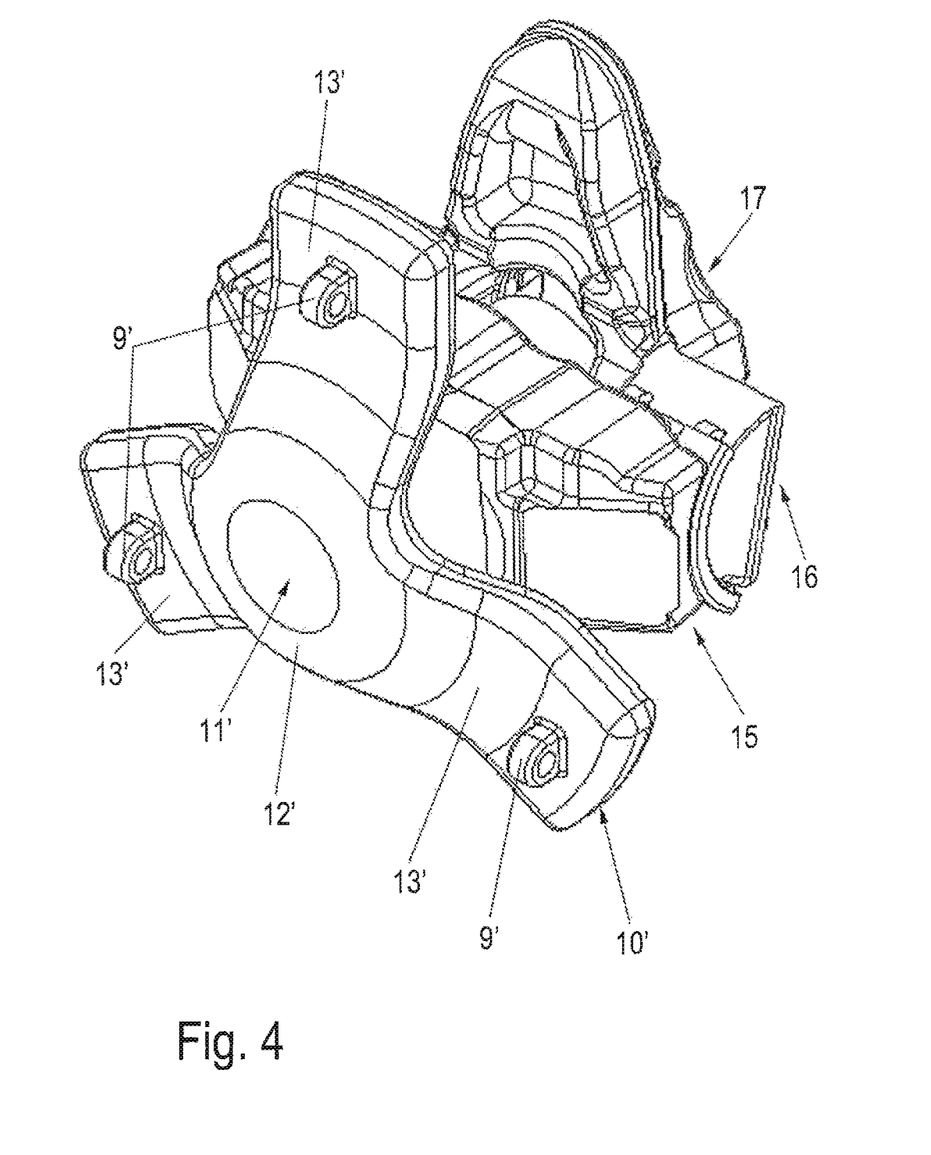
FIG. 4 shows a perspective partial view of components of the illustrative embodiment according to FIG. 1 with a three-armed pressure plate.
Figure 5:
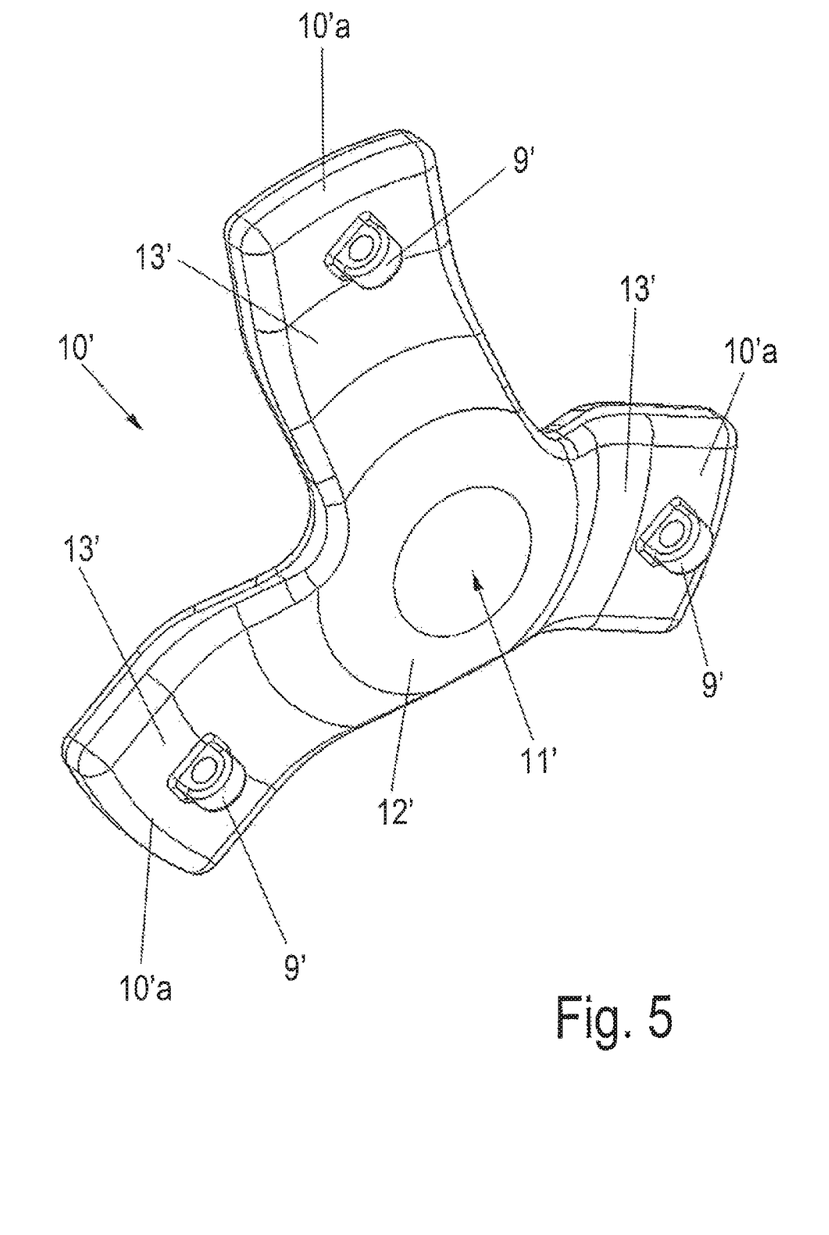
FIG. 5 shows a perspective view of the three-armed pressure plate according to FIG. 4.

FIG. 4 shows a perspective partial view of components of the illustrative embodiment according to FIG. 1 with a three-armed pressure plate 10'; and FIG. 5 shows a perspective view of the three-armed pressure plate 10' according to FIG. 4.

The application unit with the threaded tube 14 (covered by the pressure plate 10), the bridge 15 and the lever 16 is shown in FIG. 4. The adjustment device 17 is indicated.

The pressure plate 10 is of three-armed design and has a central section 12' with a three introduction section 11'. As in the case of the pressure plate of the illustrative embodiment, the force introduction section 11' is constructed with three pressure pistons 6 according to FIG. 1 and likewise interacts with the application unit via the threaded tube 14.

The three pressure arms 10'*a*, each with a pressure section 13', are arranged at regular angular intervals on the central section 12. In the variant shown here, the pressure plate joint sections 9' of the pressure joints 7 are designed as tongues (like the pressure piston joint sections 8 of the illustrative embodiment according to FIG. 1).

The associated three pressure pistons 6 of this three-pressure piston disc brake 1 are not shown but would be readily understood. The associated bottom plate 4 is fitted with a corresponding number and arrangement of pressure piston guides 5 with the sealing devices 20 described above.

The pressure plates 10 and 10° can be produced as castings or forgings, for example, wherein the pressure plate joint sections 9, 9' are shaped by finish machining. Of course, other methods of production are possible.

The invention is not restricted to the illustrative embodiments described above. Thus, for example, the lever 16 and also the pressure plates 10, 10' can be produced by casting with corresponding strength-optimized shaping in an optimized variant. Costs and manufacturing effort are thereby reduced.

LIST OF REFERENCE SIGNS 1 disc brake
2 brake pad
3 pressure section
4 bottom plate
5 pressure piston guide
6 pressure piston
7 pressure joint
8 pressure piston joint section
9, 9' pressure plate joint section
10, 10' pressure plate
10*a*, 10'*a* pressure arm
11, 11' force introduction section
12, 12' central section
13, 13' pressure section
14 threaded tube
15 bridge
16 lever
17 adjustment device
18 stripper element
19 seal element
20 sealing device The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A multiple-piston disc brake having a brake disc, comprising:
    a caliper configured to straddle the brake disc;
    at least two pressure pistons, which are arranged movably in the caliper to apply an application force to at least one brake pad in the direction of the brake disc;
    a pressure plate, which is pivotably coupled to the at least two pressure pistons;
    an application unit, which has a pressure tube and includes an adjustment device, a bridge and a lever;
    wherein
        each of the at least two pressure pistons is mounted in an axially movable manner in a pressure piston guide securely connected to the brake caliper,
        the pressure plate is arranged between the at least two pressure pistons and the application unit.

2. The multiple-piston disc brake according to claim 1, further comprising:
    a bottom plate in which is arranged each of the pressure piston guides.

3. The multiple-piston disc brake according to claim 2, wherein the pressure piston guides are formed integrally with the bottom plate.

4. The multiple-piston disc brake according to claim 3, wherein each pressure piston guide has a sealing device that interacts with an associated pressure piston.

5. The multiple-piston disc brake according to claim 4, wherein the sealing device of each pressure piston guide comprises at least one stripper element and at least one seal element.

6. The multiple-piston disc brake according to claim 5, wherein:
    the at least one stripper element is arranged on a side of the bottom plate facing the brake pad, and
    the at least one seal element is arranged on a side of the bottom plate facing away from the brake pad.

7. The multiple-piston disc brake according to claim 6, wherein the disc brake is configured such that the at least one seal element is reachable and exchangeable from the side of the bottom plate facing away from the brake pad.

8. A multiple-piston disc brake having a brake disc, comprising:
    a caliper configured to straddle the brake disc;
    at least two pressure pistons, which are arranged movably in the caliper to apply an application force to at least one brake pad in the direction of the brake disc;
    a pressure plate, which is coupled to the at least two pressure pistons;
    an application unit, which has a pressure tube and includes an adjustment device, a bridge and a lever;
    wherein
        each of the at least two pressure pistons is mounted in an axially movable manner in a pressure piston guide securely connected to the brake caliper,
        the pressure plate is arranged between the at least two pressure pistons and the application unit, and
        each of the at least two pressure pistons is coupled to the pressure plate via a pressure joint, the pressure joints being pivotable about an axis perpendicular to a direction of the application force and to an axis of rotation of the brake disc.

9. The multiple-piston disc brake according to claim 1, wherein the pressure plate is a machine forged or cast part.

10. The multiple-piston disc brake according to claim 9, wherein the lever is a machine forged or cast part.

11. The multiple-piston disc brake according to claim 1, wherein the lever is a machine forged or cast part.

12. The multiple-piston disc brake according to claim 1, wherein the adjustment device is arranged in the caliper such that the adjustment device is reachable and exchangeable from an exterior of the caliper.

13. A brake system for a vehicle, comprising:
   a multiple-piston disc brake comprising:
      a brake disc;
      a caliper configured to straddle the brake disc;
      at least two pressure pistons, which are arranged movably in the caliper to apply an application force to at least one brake pad in the direction of the brake disc;
      a pressure plate, which is pivotably coupled to the at least two pressure pistons;
      an application unit, which has a pressure tube and includes an adjustment device, a bridge and a lever;
      wherein
         each of the at least two pressure pistons is mounted in an axially movable manner in a pressure piston guide securely connected to the brake caliper,
         the pressure plate is arranged between the at least two pressure pistons and the application unit.

\* \* \* \* \*